United States Patent
Philip et al.

(10) Patent No.: US 10,346,732 B2
(45) Date of Patent: Jul. 9, 2019

(54) RF TRANSCEIVER

(71) Applicant: NXP B.V., Eindhoven (NL)

(72) Inventors: Melaine Philip, Caen (FR); Olivier Susplugas, Caen (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/842,871

(22) Filed: Dec. 14, 2017

(65) Prior Publication Data

US 2018/0165560 A1 Jun. 14, 2018

(30) Foreign Application Priority Data

Dec. 14, 2016 (EP) ..................................... 16306682

(51) Int. Cl.
*G06K 19/07* (2006.01)
*H04B 5/00* (2006.01)
*H04B 5/02* (2006.01)

(52) U.S. Cl.
CPC ..... *G06K 19/0705* (2013.01); *G06K 19/0712* (2013.01); *H04B 5/0031* (2013.01); *H04B 5/0056* (2013.01); *H04B 5/02* (2013.01)

(58) Field of Classification Search
CPC ........... G06K 19/0705; G06K 19/0712; H04B 5/0031; H04B 5/0056; H04B 5/02
See application file for complete search history.

(56) References Cited

U.S. PATENT DOCUMENTS

| | | | | |
|---|---|---|---|---|
| 2005/0143026 A1* | 6/2005 | Bellantoni | ........... | H04B 1/0458 455/121 |
| 2007/0099646 A1* | 5/2007 | Tanaka | .................. | G01S 5/0221 455/522 |
| 2008/0219391 A1* | 9/2008 | Moubarak | ................. | G06F 1/10 375/356 |
| 2009/0026844 A1* | 1/2009 | Iisaka | ..................... | H02J 7/025 307/104 |
| 2015/0178525 A1* | 6/2015 | Lee | .................... | G06K 7/10158 340/10.1 |
| 2016/0078215 A1* | 3/2016 | Robshaw | .............. | H04L 9/3215 340/10.42 |
| 2016/0234008 A1* | 8/2016 | Hekstra | .................. | H04W 4/80 |

FOREIGN PATENT DOCUMENTS

EP 2 945 043 A1 11/2015

OTHER PUBLICATIONS

Extended European Search Report for Patent Appln. No. 16306682.2 (dated May 30, 2017).
(Continued)

*Primary Examiner* — Thomas D Alunkal

(57) ABSTRACT

A RF transceiver for RF communication with a further RF transceiver is described. The RF transceiver comprises a RF transmitter; a clock generator coupled to the RF transmitter, the clock generator comprising a crystal oscillator circuit including an amplifier, a distance monitor configured to monitor the distance between the RF transceiver and the further RF transceiver; a controller coupled to the distance monitor and the clock generator. The controller is configured to vary the crystal oscillator swing amplitude dependent on the distance between the RF transceiver and the further RF transceiver.

15 Claims, 11 Drawing Sheets

(56) References Cited

OTHER PUBLICATIONS

"Oscillator design guide for STM8S, STM8A and STM32 microcontrollers—AN2867 Application Note", ST Microelectronic, 42 pgs. (Aug. 2015).
Garcin, S. G. de A. "Crystal Oscillator Troubleshooting Guide—AN3208 Application Note Rev. 0", Freescale Semiconductor, 10 pgs. (Jan. 2006).
Hagedorn, J. "Crystal Oscillator Performance of the CDCLVC1310—SCAA119 Application Report", Texas Instruments, 13 pgs. (Sep. 2012).

* cited by examiner

RF TRANSCEIVER

CROSS-REFERENCE TO RELATED APPLICATIONS

This application claims the priority under 35 U.S.C. § 119 of European patent application no. 16306682.2, filed on Dec. 14, 2016, the contents of which are incorporated by reference herein.

This disclosure relates to Radio frequency (RF) transceivers.

RF transceivers may be used for example for communication devices such as Bluetooth, ZigBee, radio frequency identification (RFID), and near-field communication (NFC) devices which communicate over a short range of less than a few centimeters to a few tens of meters. RFID and NFC devices may include a reader device which normally has a power source. The Reader may communicate with a further RF device which may or may not have its own power source. The further RF device may be for example a contactless smart card, a smart poster, or an RFID tag. Mobile devices such as for example mobile phones may be configured to operate as either readers, cards or tags.

Various aspects of the disclosure are defined in the accompanying claims. In a first aspect there is described a RF transceiver for short-range RF communication with a further RF transceiver, the RF transceiver comprising: a RF transmitter; a clock generator coupled to the RF transmitter, the clock generator comprising a crystal oscillator circuit including an amplifier, a distance monitor configured to monitor the distance between the RF transceiver and the further RF transceiver; a controller coupled to the distance monitor and the clock generator; wherein the controller is configured to vary the crystal oscillator swing amplitude dependent on the distance between the RF transceiver and the further RF transceiver.

In embodiments, the RF transceiver may further comprise a detector coupled to the controller, the detector being configured to detect the presence of the further RF transceiver; wherein the controller is further configured to: vary the crystal oscillator swing amplitude in response to the presence of the further RF transceiver being detected.

In embodiments, the crystal oscillator circuit may comprise a crystal oscillator voltage driver for supplying power to the crystal oscillator circuit amplifier and wherein the controller is configured to increase the crystal oscillator swing amplitude by increasing the voltage supplied to the crystal oscillator circuit amplifier from a first voltage to a second higher voltage in response to the monitored distance being above a predetermined distance threshold.

In embodiments of the RF transceiver, the controller may be configured to increase the crystal oscillator swing amplitude by reducing the voltage supplied from the second voltage to the first voltage after a predetermined time period.

In embodiments of the RF transceiver, the controller may be configured to reduce the voltage from the second voltage to the first voltage in response to the monitored distance being below a further predetermined distance threshold.

In embodiments of the RF transceiver, the controller may be configured to reduce the crystal supply voltage from the second voltage to the first voltage when no further RF transceiver is detected.

In embodiments of the RF transceiver, the crystal oscillator voltage driver may comprise a slope generator coupled to a voltage regulator and wherein the slope generator is operable to change the input voltage to the voltage regulator between the first voltage value and the second voltage value in response to a control signal from the controller.

In embodiments of the RF transceiver, the distance monitor may comprise a current sensor configured to determine a value of the current consumption during RF transmission by the RF transceiver and wherein the current consumption value is indicative of a relative distance between the RF transceiver and a further RF transceiver.

In embodiments of the RF transceiver, the crystal oscillator supply voltage may be reduced in response to the variation in current consumption increasing above a reference current threshold.

In embodiments of the RF transceiver, the distance monitor may comprise an amplitude detector configured to detect the amplitude of a received signal from a further RF transceiver.

In embodiments of the RF transceiver, the crystal oscillator circuit may comprise a variable gain amplifier and the controller may be configured to vary crystal oscillator swing amplitude by varying the gain of the amplifier.

Embodiments of the RF transceiver may be included in a NFC reader, wherein the controller may be configured to: detect the presence of a further NFC device; in response to the detection, increase the oscillator swing amplitude; in response to the monitored distance being below a predetermined threshold, decrease the oscillator swing amplitude; in response to the monitored distance being above a predetermined threshold, increase the oscillator swing amplitude; in response to the presence of the further NFC device no longer being detected, reduce the oscillator swing amplitude.

In a second aspect there is described a method of RF communication for an RF transceiver comprising a crystal oscillator circuit including an amplifier for providing a clock signal to the RF transceiver, the method comprising: monitoring the distance between the RF transceiver and a further RF transceiver; varying the crystal oscillator amplitude swing dependent on the distance between the RF transceiver and the further RF transceiver.

Embodiments may comprise detecting the presence of a further RF transceiver and varying the crystal oscillator amplitude swing by varying the supply voltage in response to the presence of a further RF transceiver being detected.

Embodiments may comprise varying the amplitude swing by varying the crystal oscillator supply current in response to the presence of a further RF transceiver being detected.

In the figures and description like reference numerals refer to like features. Embodiments of the invention are now described in detail, by way of example only, illustrated by the accompanying drawings in which.

Figure 1:
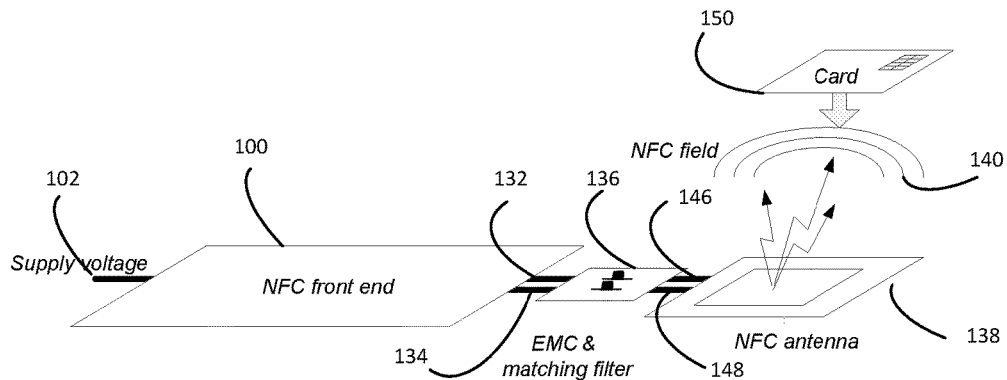
FIG. 1 shows a Near-Field Communication (NFC) NFC reader and a contactless card.

FIG. 1 shows a typical Radio Frequency Identification (RFID) application use case of a NFC short-range RF data communication between a smart card 150 and a reader. The smart card may for example be a type-A card compliant according to ISO/IEC 14443-A. In other examples, the smart card may be a type-B or a type-F card compliant to ISO 14443. The NFC reader typically includes an NFC front-end 100, a filter network 136 and an NFC antenna 138. The NFC front-end 100 has a supply voltage connection 102. The NFC front-end 100 may typically be connected via connections 133,134 to the EMC and matching filter network 136. The EMC and matching filter network 136 is connected via connections 146,148 to the NFC antenna 138. The NFC field 140 generated by the NFC reader and transmitted by the NFC antenna 138, typically has a range of up to 100 mm (with respect to ISO14443). The NFC front-end 100 executes RF polling loops for detecting the presence of a card 150. Once a card 150 is introduced inside the field, as illustrated from above down towards the antenna 138, data exchanges between the card 150 and the NFC front-end 100 may occur. Typically, NFC communication is based on a 13.56 MHz carrier frequency and data are sent by modulating the amplitude of the NFC reader field at 106 KHz, or 212 KHz, or 424 KHz or 848 KHz baud rates.

Figure 2:
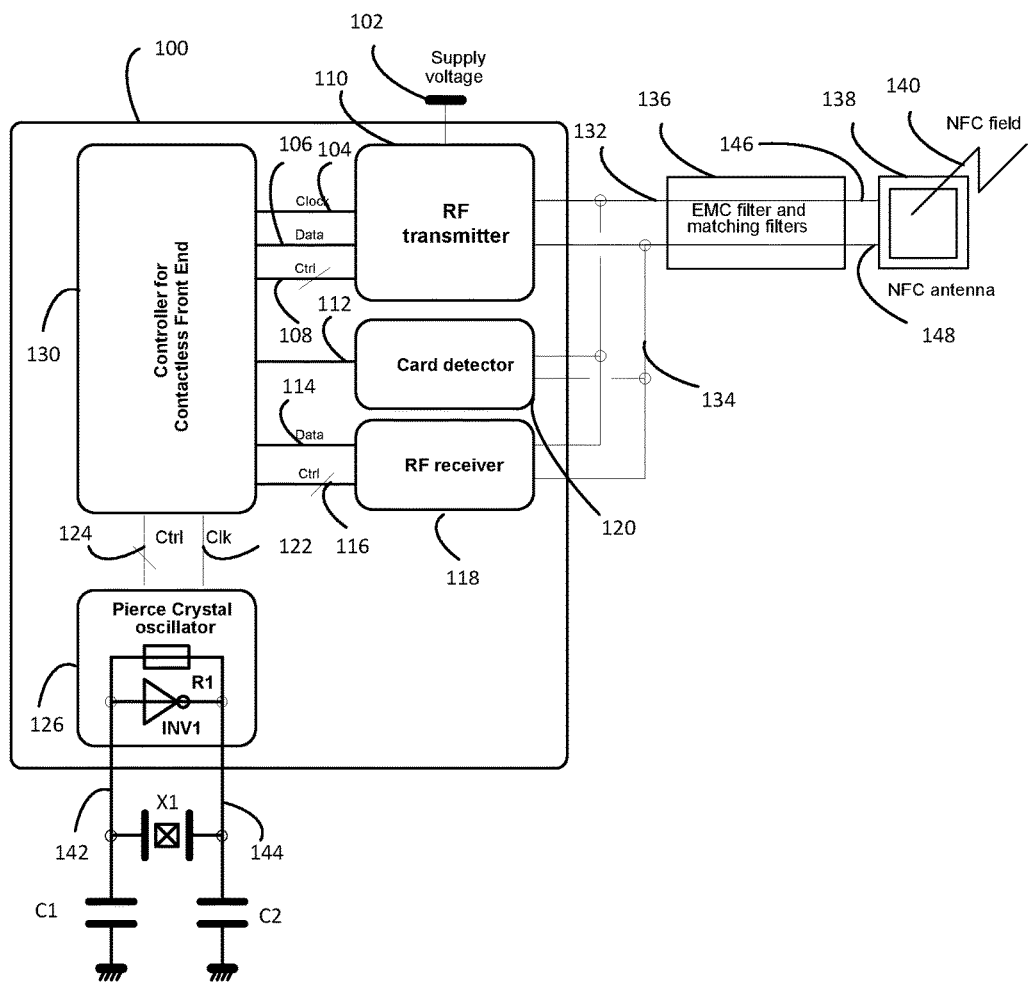
FIG. 2 shows a further detail of the NFC reader of FIG. 1.

FIG. 2 shows the NFC reader of FIG. 1 with further detail of the NFC front-end 100. The NFC front-end 100 includes a RF transmitter 110, a card detector 120, an RF receiver 118, a controller 130, and a clock generator 126 which includes a Pierce crystal oscillator circuit 126. The RF transmitter 110, the card detector 120, and the RF receiver 118 are connected to the EMC filter and matching filter network 136 by connections 132 and 134. The matching filter network 136 is connected via connections 146,148 to the NFC antenna 138. The supply voltage terminal 102 may be connected to the NFC front-end 100 to provide power during operation.

The controller 130 may have a clock connection 104 to the RF transmitter 110. The controller 130 may have a transmitter data output 106 connected to the RF transmitter 110. The controller 130 may have a transmit control output 108 connected to the RF transmitter 110. The controller 130 may have a detect input 112 connected to a card detector 120. The controller 130 may have a receive data input 114 connected to the RF receiver 118. The controller 130 may have a RF receiver control output line 116 connected to the RF receiver 118.

The controller 130 may have a clock input connected to the clock generator output 122. The controller 130 may have a clock control output 124 connected to the clock generator 126. The clock generator 126 includes a Pierce crystal oscillator circuit having a resistor R1 in parallel with an inverting amplifier INV1. An input of inverting amplifier INV1 is connected to terminal 142. An output of inverting amplifier INV1 is connected to terminal 144. A capacitor C1 is connected between terminal 142 and a ground terminal. A capacitor C2 is connected between terminal 144 and a ground terminal. A crystal X1 is connected between terminals 142 and 144.

Figure 3:
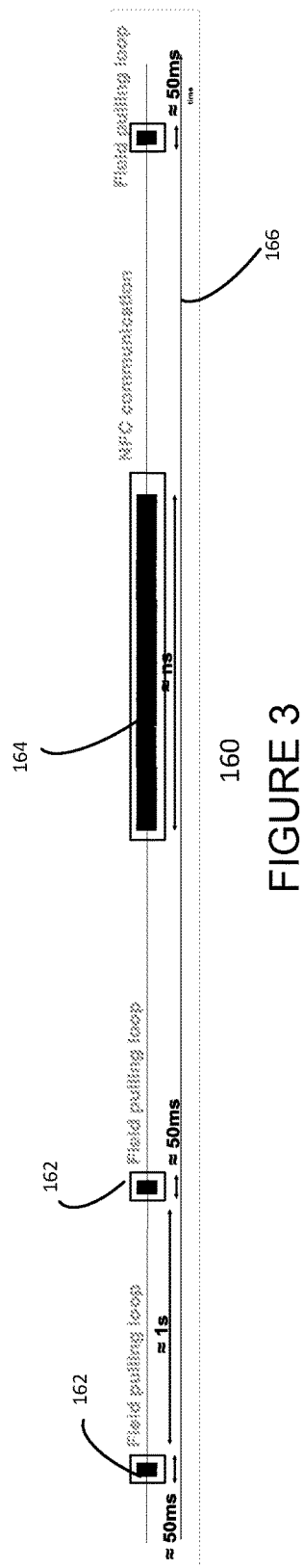
FIG. 3 shows the polling loop and the NFC communication of the NFC system of FIG. 1.
Figure 4:
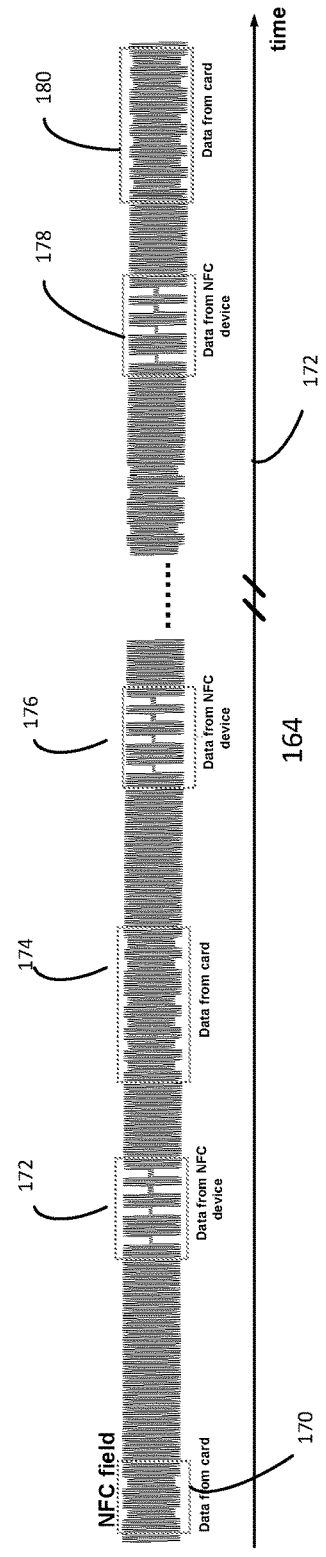
FIG. 4 illustrates further details of the field shape during NFC communication by the NFC system of FIG. 1.

The operation of the RF reader is illustrated with reference to FIGS. 3 and 4. FIG. 3 shows a chronograph 160 of the behaviour of the field polling loop and NFC communication over time 162. FIG. 4 shows a chronograph 170 with more detail on the NFC transactions.

Initially, the controller 130 will execute one or more field polling loops 162 whereby the card detector 120 is polled by the controller 130. This field polling loop 162 may have a duration for example of around 50 milliseconds. If no card is detected, then the controller 130 may wait for a period for example of one second before repeating the field polling loop 162. If a card is detected then there will be a data exchange 164 between the NFC card 150 and the NFC reader including the NFC front-end 100.

FIG. 4 shows the data exchange 164 in more detail with respect to time 166. The data exchange typically consists data transmissions from the card 170, 174, 180 which may alternate with data transmitted from the NFC device 172, 176, 178. The data from the NFC device shows a 100% amplitude modulation of the NFC field 140. The data 172, 176, 178 from the card 150 may have a variable amplitude modulation, which typically depends on the distance between the card and the NFC antenna 138. When the card 150 is closer to the antenna 138, the modulation maybe higher.

The higher levels of modulation can be more accurately received and decoded by the RF receiver 118 and the controller 130. At the limits of the NFC field 140, the data communication between the NFC reader and the card 150 may not be as reliable.

Figure 5:
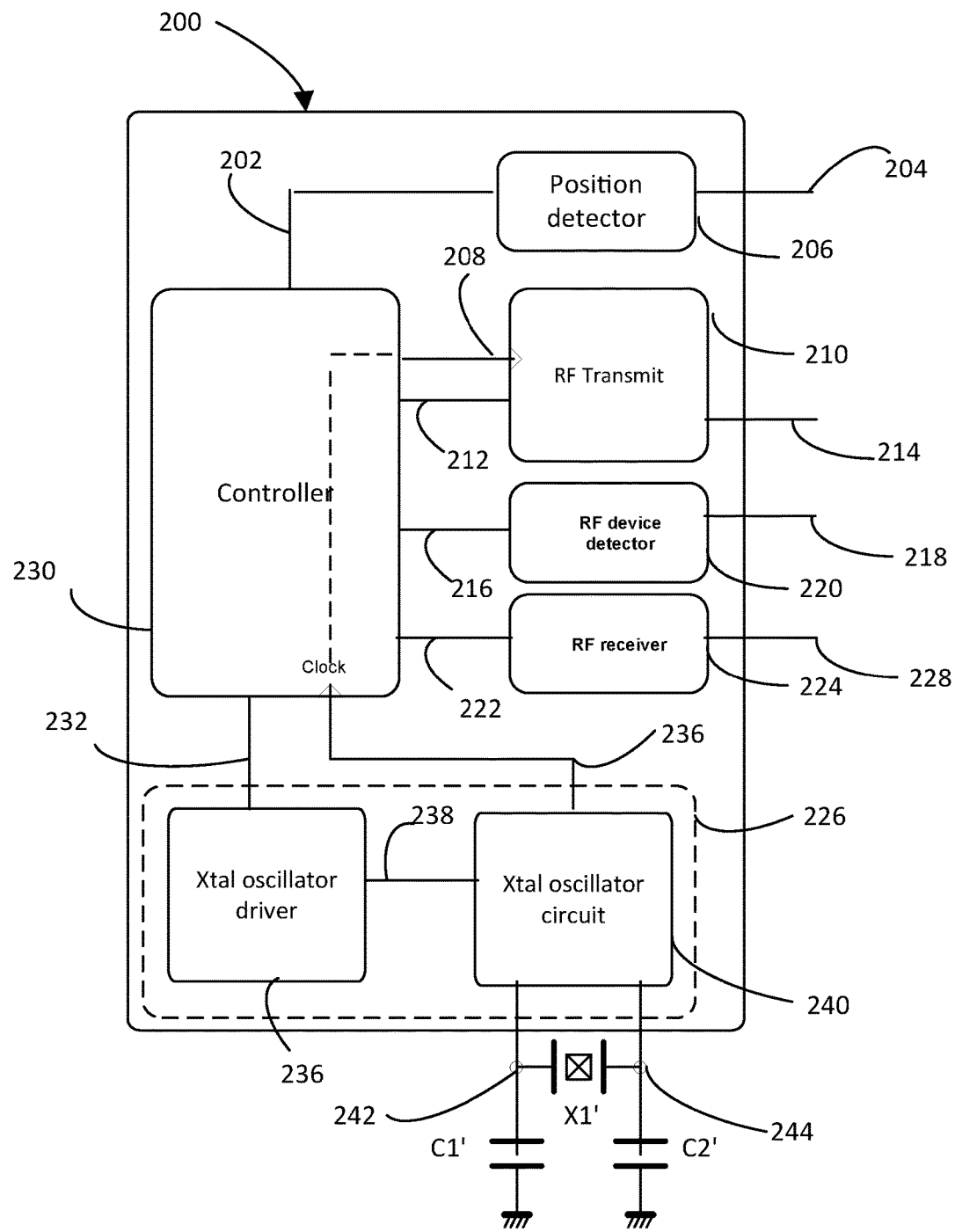
FIG. 5 shows a RF transceiver according to an embodiment.

FIG. 5 shows an RF transceiver 200 according to an embodiment. The RF transceiver 200 may include a position or distance detector 206, a RF transmitter 210, a RF device detector 220, an RF receiver 224, a clock generator 240, and a controller 230. The clock generator 240 may include a crystal oscillator circuit 240 and a crystal oscillator driver 236. The RF transceiver 200 may also be referred to as a Proximity Coupling Device (PCD).

The position or distance detector 206 may have an input 204 and an output 202 connected to the controller 230. The controller 230 may have a clock input 236 connected to the output of the clock generator 240. The clock signal generated by the clock generator 240 may be provided by the controller 230 to the clock input 208 of an RF transmitter 210 as indicated by the dashed line 209. In other examples, the output of the crystal oscillator circuit 236 may be connected directly to the clock input 208 of the RF transmitter 210.

The RF transmitter 210 may have an input 212 connected to the controller. The RF transmitter 210 may have output 214 for connection to an antenna (not shown). An RF receiver 224 may have an input 228 for connection to an antenna (not shown). The RF receiver 224 may have a control and data connection 222 to the controller 230. The RF transceiver 200 may further include an RF device detector 220 which may have an input 218 for connection to an antenna (not shown). The RF device detector 220 may have an output 216 connected to the controller.

The clock generator 226 may include a crystal oscillator driver 236 connected to a crystal oscillator circuit 240 via connection 238. Crystal oscillator circuit 240 which may for example be a Pierce cell, may have a first terminal 242 and a second terminal 244. In operation of the RF transceiver a capacitor C1' may be connected between the first terminal 242 and a ground potential. A second capacitor C2' may be connected between a second terminal 244 and a ground potential. A crystal XV may be connected the between the first terminal 242 and the second terminal 244.

The RF transceiver 200 may detect by means of the RF device detector 220 the presence of a further RF transceiver (not shown) within a short range of the RF transceiver 200. In some examples, the RF transceiver may be referred to as a transponder or a Proximity Inductive Coupling Card (PICC). Once the further RF transceiver has been detected by the RF device detector 220, the controller 230 may increase the power supply provided to the external crystal XV by the control of the crystal oscillator driver 236. The position or distance of the further RF transceiver device with respect to an antenna connected to the RF transceiver 200 may be determined by the position detector 206. The position detector 206 may determine a value of position from the strength of a received signal from the further RF device. Alternatively, or in addition, the position detector 206 may monitor a supply current provided to the RF transmitter 210 which may also give an indication of the relative position or distance of the further RF transceiver to an antenna (not shown) connected to the RF transceiver 200. In other examples, the supply voltage to the RF transmitter 210 may be monitored to give an indication of the relative position.

In other examples a received strength signal indication (RSSI) measurement may be used to provide a value representing the distance between the RF transceiver and a further RF transceiver.

The controller 230 may monitor the position provided by the position detector 206, and in response to the distance between the RF transceiver 200 and the further RF transceiver being below a certain threshold, the controller 230 may decrease the power supply voltage provided to the external crystal XV by controlling the crystal oscillator driver 236. If the position of the further RF transceiver with respect to the RF transceiver 200 subsequently increases above a certain threshold, the controller 230 may increase the power supply voltage to the crystal oscillator XV provided by the crystal oscillator driver 236. When a further RF device is no longer detected by the RF device detector 220, the controller 230 may reduce the power supply provided by the crystal oscillator driver 236 to the external crystal X1'.

The inventors of the present disclosure have appreciated that in many radio communications between an RF transceiver and a further RF transceiver, following an initial detection of the presence of a further RF transceiver, the communication between the RF transceiver and the further RF transceiver may initially be unreliable, only becoming more reliable as the devices come much closer together. By varying the drive strength of the power supply provided to the crystal oscillator circuit 240 in the clock generator 226. The RF transceiver 200 may communicate much more reliably with a further RF transceiver following the initial detection of the further RF device. In some use cases the distance between RF devices after initial detection may reduce and then increase until the further RF device can no longer be detected. These use cases occur for example during communication between an NFC card reader, and a contactless card. In other examples, use cases may occur where the distance between RF devices vary during communication. These use cases may occur between Bluetooth devices, Wi-Fi 802.11 devices or ZigBee devices for example when either or both the RF transceiver and further RF transceiver are included in a mobile device. Conventionally a crystal oscillator is driven with a constant power supply. The power supply value determines the amount of phase noise generated by the crystal oscillator. Increasing the power supplied to a crystal oscillator circuit is known to have an improved effect on the phase noise of the crystal oscillator. However, an increased power supply also reduces the lifetime of the crystal and consequently the reliability of the device. In many applications, it is desirable to use a relatively small crystal or micro crystal. For example NFC systems, the NFC 27.12 MHz crystal may be required such as the NDK 27.12 MHz crystal (NX2016SA). Such crystals have a maximum specified drive level for different applications which if exceeded may shorten the lifetime of the crystal. However, by overdriving the crystal for a relatively short space of time, the phase noise maybe temporarily improved when the further RF transceiver is relatively far away from the RF transceiver but still detectable without damaging the crystal. This may result in more reliable communication between the RF transceiver device 200 and the further RF transceiver device after initial detection of the presence of the further RF transceiver device.

RF transceiver 200 may communicate over a range of a few centimeters. In other examples, the RF transceivers may support Bluetooth, ZigBee or other communication protocols such as ISO 15693. These transceivers may communicate in the range of up to a few tens of meters.

Figure 6:
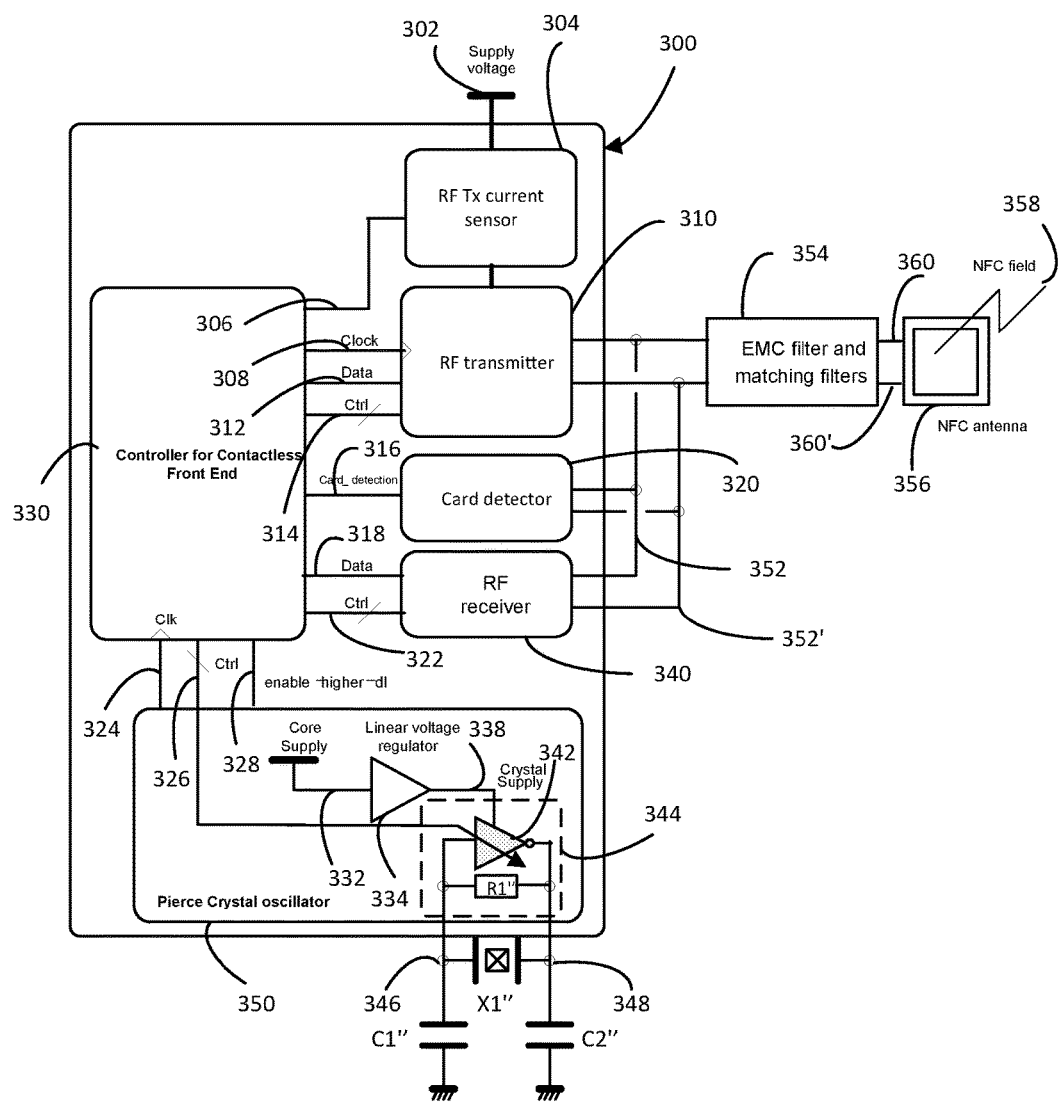
FIG. 6 illustrates a NFC reader including a RF transceiver according to an embodiment.

FIG. 6 shows an NFC reader including an NFC front-end transceiver 300. NFC front-end transceiver 300 includes a transmitter current sensor 304, an RF transmitter 310, a card detector 320, an RF receiver 340, a clock generator 350, and a controller 330. The clock generator 350 includes a Pierce cell crystal oscillator circuit 344 including a variable gain amplifier 342. The clock generator 350 and a linear voltage regulator 362 which supplies power to the crystal oscillator circuit 344.

A supply voltage terminal 302 for supplying the NFC front-end transceiver 300 may be connected to the current sensor 304. In operation, the current sensor 304 may detect the current flowing to an RF transmitter 310. A current sensor output 306 may be connected to the controller 330.

A transmitter clock output 308 from the controller 330 may be connected to the RF transmitter 310. A transmission data output 312 from the controller 330 may be connected to the RF transmitter 310. A transmitter control output 314 from the controller 330 may be connected to the RF transmitter 310.

The card detector 320 may have a card detection output 316 connected to the controller 330. An RF receiver 340 may have a receive data output 318 connected to the controller 330. The RF receiver 340 may have a receiver control input 322 connected to the controller 330. RF connections 352, 352' may be connected to the RF transmitter 310 the card detector 320 and the RF receiver 340. RF signal connections 352, 352' may be connected to the EMC filter and matching filter network 354. An NFC antenna 356 may be connected to the EMC filter and matching filter network 354 via connections 360, 360'.

The controller 330 may have a clock input 352 connected to the clock generator 350. The controller 330 may have a clock control output 3266 connected to the clock generator 350. The clock provided by the clock generator 350 may be provided by the controller 330 to the transmitter clock output 308. The clock generator 350 includes a Pierce cell 344 which typically includes a resistor R1" in parallel with a variable gain amplifier 342. An input of variable gain amplifier 342 is connected to terminal 366. An output of variable gain amplifier 342 may be connected to terminal 344. Capacitor C1" may be connected between terminal 346 and a ground terminal. Capacitor C2" may be connected between terminal 344 and a ground terminal. A crystal X1" may be connected between terminals 344 and 346.

Figure 7:
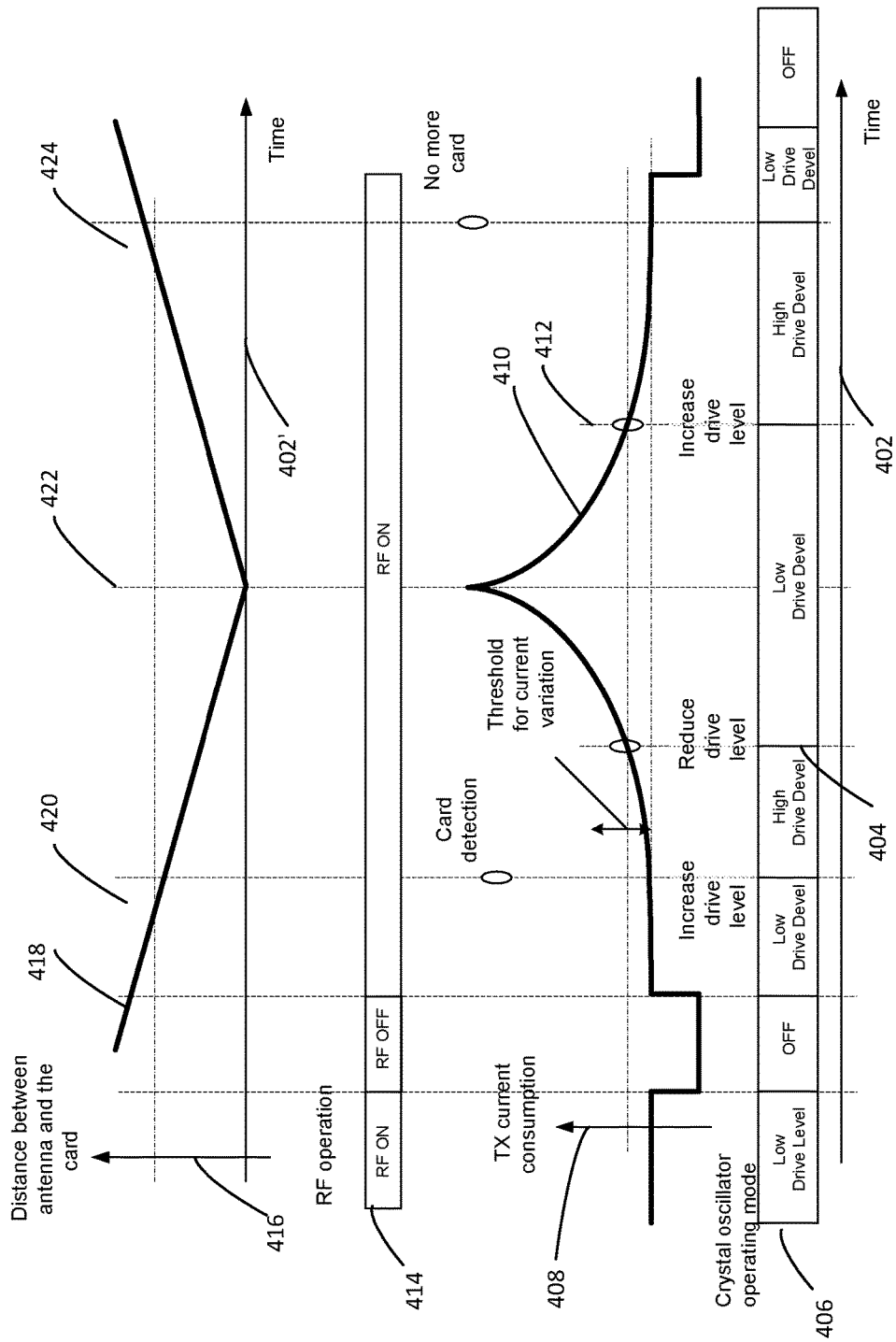
FIG. 7 illustrates a chronogram of the variation of transmitter current consumption, RF operation and crystal oscillator operating mode dependent on the distance between the NFC reader of FIG. 6 and a further NFC device.

The input 332 of the linear voltage regulator may be connected to the power supply. The regulated power supply output of the linear voltage regulator 334 may be connected to the variable gain amplifier 342. The controller 330 may have a clock control connection 354 connected to the variable gain amplifier 342. The clock control connection 326 may be a single wire or a bus connection. A power supply control line 328 for regulating the power supply may be connected to the linear voltage regulator 362. The controller 330 may alter the gain of the variable gain amplifier 368 to vary the current which resulting in a variation in the oscillator swing. Increasing the current may increase the oscillator swing and decreasing the current may decrease the oscillator swing. The variable gain amplifier 368 may be implemented for example by a number of selectable transistors arranged in parallel or by other variable gain amplifier circuits. An example of the operation of the NFC front-end transceiver 300 is further explained with reference to FIG. 7. FIG. 7 shows a chronograph 400 of the operation as a further NFC device, for example a contact-less card, is inserted into the NFC field 372 of an NFC device reader including the NFC front-end transceiver 300. The x-axes 402, 402' show time. The first y axis 416 shows the variation of the distance between the NFC antenna 370 and the further NFC device. The second y axis 408 shows the current consumption of the RF transmitter 310 during the data communication between the NFC front-end transceiver 300 and the further NFC device. The operating mode 406 of the crystal oscillator i.e. low level or high level is illustrated at different points of time. The RF operation 414 status i.e. RF on or RF off is shown at different point of time.

During a typical transaction, the distance between a NFC card and the NFC reader first reduces then increases as shown by line 418. Prior to time 420, the NFC transceiver 300 may be polling at various intervals to determine whether a card has been detected. While no card is detected, the clock generator 350 as indicated by clock generator mode 406 is either operated at a relatively low drive level or is switched off.

At time 420, a card may be detected by card detector 320. At this point the controller 330 may increase the crystal oscillator power supply 334 to a higher voltage via voltage regulator control line 328. Increasing the voltage may increase the oscillator swing or amplitude. Once the card has been detected, the controller 330 may determine the transmitter current consumption from the current detector 304. As the card moves closer to the antenna 356, the impedance seen by the RF transmitter 310 may decrease, resulting in an increase in the current drawn by the transmitter 310. Consequently, by measuring the transmitter current, a value representing the position or distance of the card from the antenna 356 may be determined.

At time 404, the monitored current 410 required by the transmitter 310 as measured by the current sensor 306 may increase above a reference value which may be a predetermined reference value. The controller 330 may reduce the drive strength of the crystal power supply by reducing the supply voltage in response to the current increasing above the reference current value. Reducing the drive strength of the crystal power supply may reduce the oscillator swing.

The distance 418 between the smart card and the NFC antenna 356 is a minimum at time 422 and then increases. At time 412, the monitored current may decrease below the predetermined threshold corresponding to an increase in distance between the NFC reader and the further NFC device. At this point, the controller 330 may increase the drive level to the crystal oscillator circuit 374 by increasing the supply voltage provided by the linear voltage regulator 334. At time 424, the card detector 320 may indicate that a card can no longer be detected. In response to no card being detected, the controller 330 may then reduce the supply voltage level to the crystal oscillator circuit 374.

In other examples, the RF front end 300 may vary the oscillator swing by varying the gain of the variable gain amplifier 368.

Figure 8A:
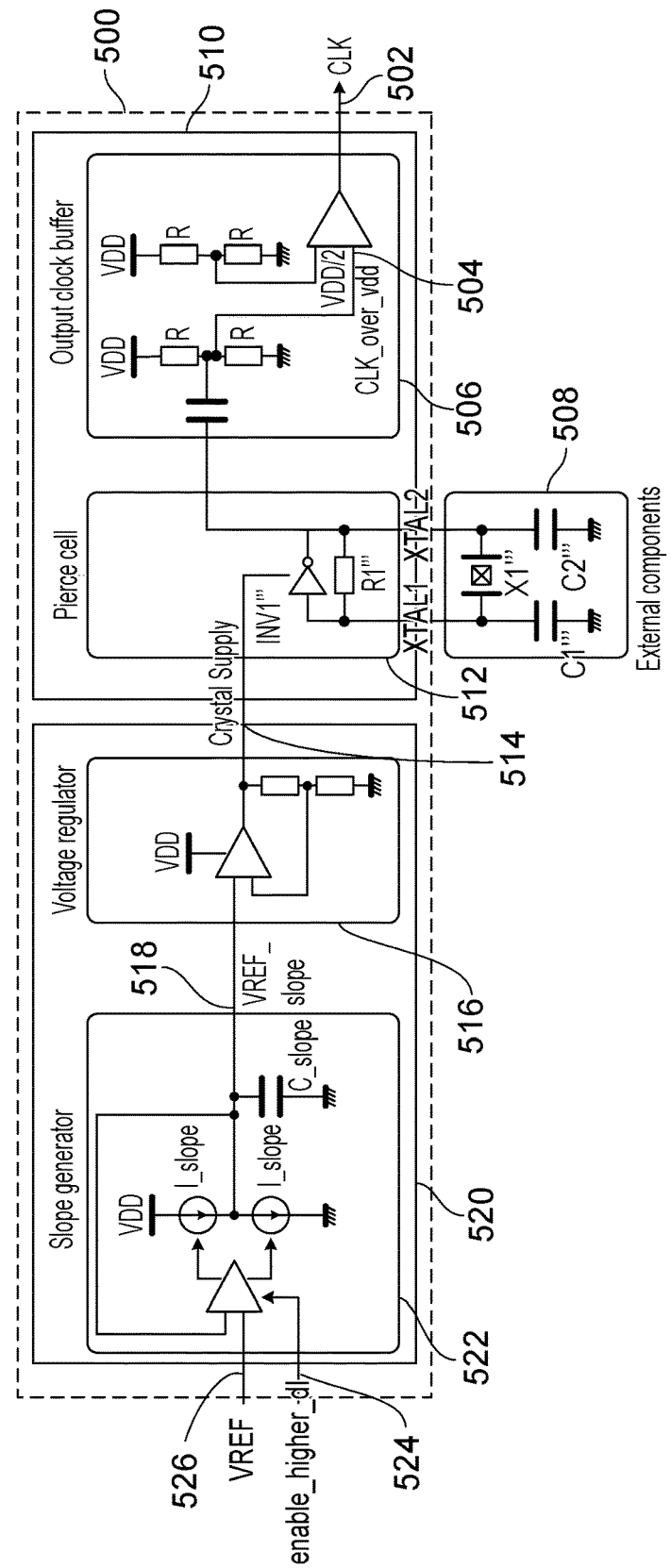
FIG. 8A illustrates crystal oscillator and power supply control circuit for an RF transceiver according to an embodiment.

FIG. 8a shows an implementation of a clock generator 500 which may be included in one or more embodiments of an RF transceiver. The clock generator 500 includes a power supply driver 520 and a crystal oscillator circuit 510. The power supply driver 520 may include a slope generator 522 and a voltage regulator 516. The crystal oscillator circuit may include a Pierce cell 512 and an output clock buffer 506.

The slope generator 522 may have a reference voltage input 526 and a control input 524. The slope generator 522 may have a slope generator output 518 connected to the voltage regulator 516. The output 514 of the voltage regulator 516 may be connected to the Pierce cell 512. The Pierce cell 512 may be connected to external components 508 including for example a crystal. The output of the Pierce cell may be connected to an output clock buffer 506. The output of the clock buffer 502 may provide a clock signal for other parts of the RF front-end circuit (not shown).

In operation the power supply driver 520 may receive a reference voltage (VREF) which is accurate and stable over operating temperature range, for example from a bandgap reference. The output voltage of the slope generator 522 can vary between VDD corresponding to the supply voltage of the crystal oscillator circuit 500 and the reference voltage VREF. The output voltage level is set by the control input 524. When control input 524 is at a logic high level, output 518 of the slope generator is VDD in steady state. When control input 524 is at a logic low level, output of the slope generator 518 is VREF in steady state.

By storing or discharging a capacitance C_slope with a current, the transition between VDD and VREF level may be linear. The slope from these two levels should not disturb the spectrum of the crystal internal clock inside the NFC communication bandwidth which may be between 100 KHz and 1 MHz. For example the slope duration should be slower than 10 μs or faster than 1 μs, in order to avoid spurious frequency in the range of 100 KHz to 1 MHz.

In order to not disturb crystal clock duty cycle during transition between supply voltages, the crystal internal clock can be generated by the clock buffer 506 by sensing crystal oscillation and following the common mode voltage of the crystal oscillation. In other examples, capacitive decoupling may be used when sensing the crystal oscillation, which may reject the variation of the crystal amplitude voltage.

For example, for a 900 mV reference voltage with a 1.8V supply. Calculation of the drive level for these two values is given using following formula $$DriveLevel = ESR \times \left(\pi \times freq \times \frac{XTAL_{pp}}{\sqrt{2}} \times (C_L + C_P)\right)^2$$

With ESR, the motional resistance of the crystal, FREQ the crystal frequency, CP the load capacitance of the crystal, CP the shunt capacitance of the crystal and XTALPP the crystal peak to peak voltage.

For example for NDK 27.12 MHz crystal NX2016SA, a reference load capacitance CL is 10 pF, FREQ=27.12 MHz, maximum motional resistance (ESR) is 100Ω, maximum CP is 0.72 pF. For 900 mV crystal drive, drive level is:

$$DriveLevel =$$
$$100\Omega \times \left(\pi \times 27.12 \text{ MHz} \times \frac{900 \text{ mV}}{\sqrt{2}} \times (10 \text{ pF} + 0.72 \text{ pF})\right)^2 = 33.785 \text{ }\mu W$$

For 1.8V crystal drive, drive level is:

$$DriveLevel =$$
$$100\Omega \times \left(\pi \times 27.12 \text{ MHz} \times \frac{1.8 \text{ V}}{\sqrt{2}} \times (10 \text{ pF} + 0.72 \text{ pF})\right)^2 = 135.14 \text{ }\mu W$$

The crystal drive level is fixed by the supply of the Pierce cell 512. When using the NDK crystal NX2016SA, the power increases from about 34 μW to 135 μW when supplying the Pierce cell 512 with 900 mV to 1.8V. The 135 uW drive level exceeds the maximum specified drive level of the NX2016SA when using clock for RF application but is done for a shorter time as described in FIG. 7. Minimizing the time during which the crystal is over-driven may preserve the long-term behavior of frequency accuracy and phase noise.

Figure 8B:
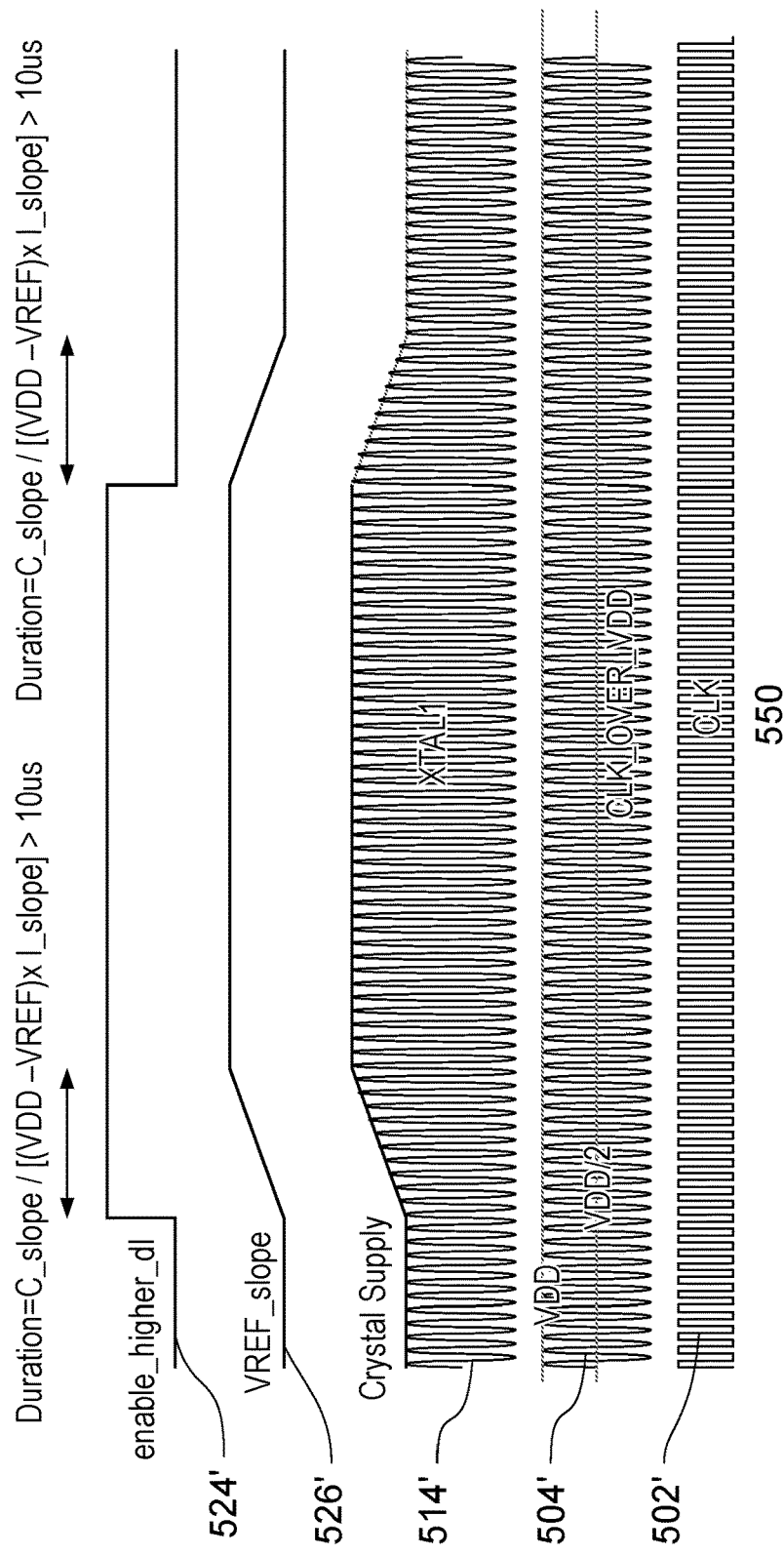
FIG. 8B shows a chronogram of the behaviour of the crystal oscillator and power supply control circuit of FIG. 8A.

FIG. 8B shows a chronograph of the various signals at different points within the clock generator 500. Line 502' shows the clock signal at node 502. Line 504' shows the behaviour of the clock_over_VDD signal at node 504. Line 514' shows the variation in the crystal supply at node 514. Line 518' shows the reference voltage slope output 518 from the slope generator 522. By having a gradual transition between crystal supply voltages, the behaviour of the clock may be more stable than for an abrupt transition.

Figure 9:
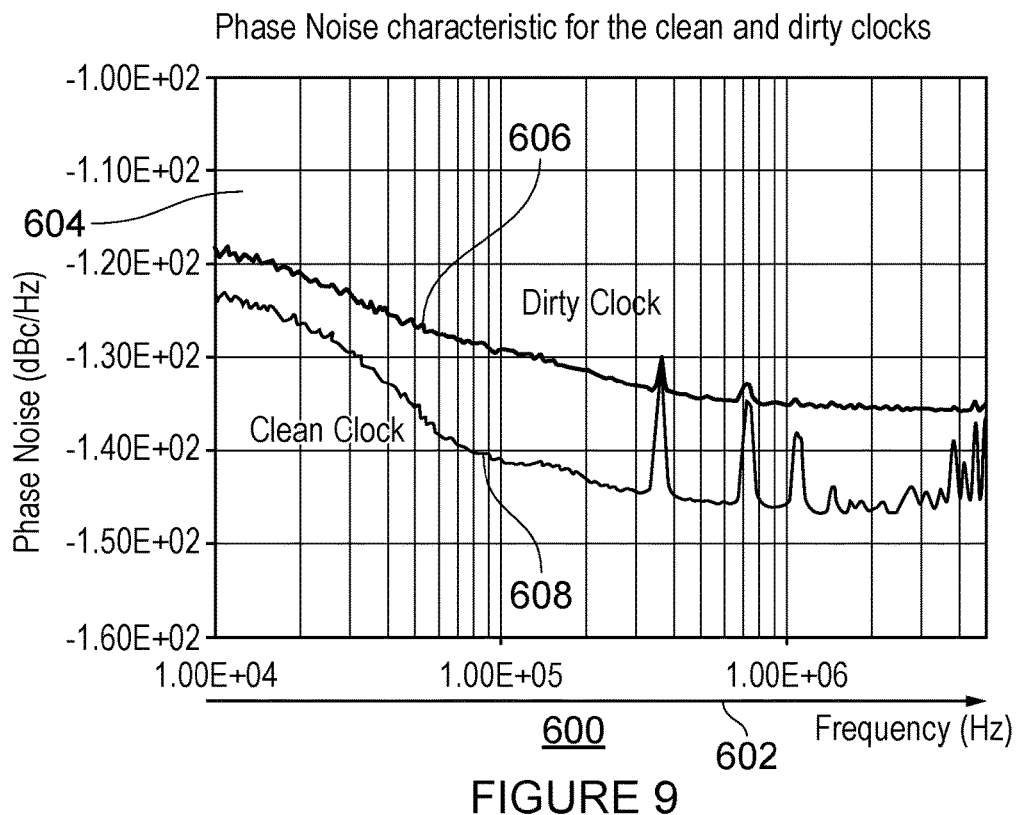
FIG. 9 shows the phase noise variation for two clocks dependent on the crystal power supply.

FIG. 9 shows a graph 600 of the phase noise characteristics for a clean clock 608 at a higher drive voltage level and the dirty clock 606 at a lower drive voltage level. The x-axis 602 shows frequency in hertz varying between 10 kHz and 5 MHz. The y-axis shows phase noise in ranging between −162 dBc/Hz to −100 dBc/Hz. As can be seen the "clean clock" 608 driven at a higher crystal power supply voltage has reduced phase noise compared to the "dirty clock" 606 driven at a lower power supply voltage.

As shown in FIG. 9, the crystal oscillator circuit 500 may be controlled to temporarily double the drive voltage for the crystal which may result in a phase noise improvement of approximately 10 dBc/Hz inside NFC communication bandwidth (from 100 KHz to 1 MHz) when the crystal oscillator circuit 500 is in full power mode (High drive level).

Figure 10:
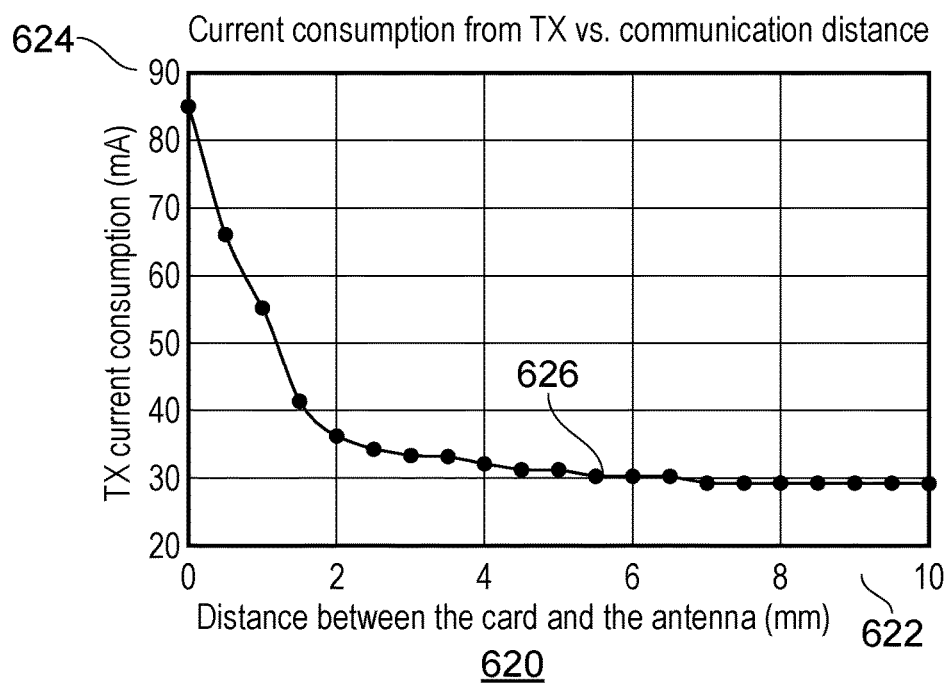
FIG. 10 shows a graph of the current consumption from the RF transmitter of a RF transceiver versus the communication distance.

FIG. 10 shows a graph 620 of current consumption from the transmitter versus communication distance. The x-axis 622 shows the distance between a card and the NFC antenna in millimeters ranging from 0 to 10 mm. The y-axis 624 shows the transmitter current consumption in milliamps ranging from 0 to 90 mA. The current consumption decreases from approximately 85 mA when the RF transceiver and the further RF transceiver are in contact, down to approximately 35 mA at a distance between the card and the antenna of 2 mm. Transmission current then decreases slightly to 30 mA and a distance of 10 nm between the card and the antenna. The transmitter power amplifier current depends on the impedance from the board/antenna seen by the transmitter power amplifier. As the card moves near to the reader, the impedance seen by the driver falls drastically. In consequence, the current drawn increases in the same proportion. In other examples, detecting the power supply voltage to the RF transmitter power amplifier may also be used to determine the proximity of the card to the reader.

Figure 11:
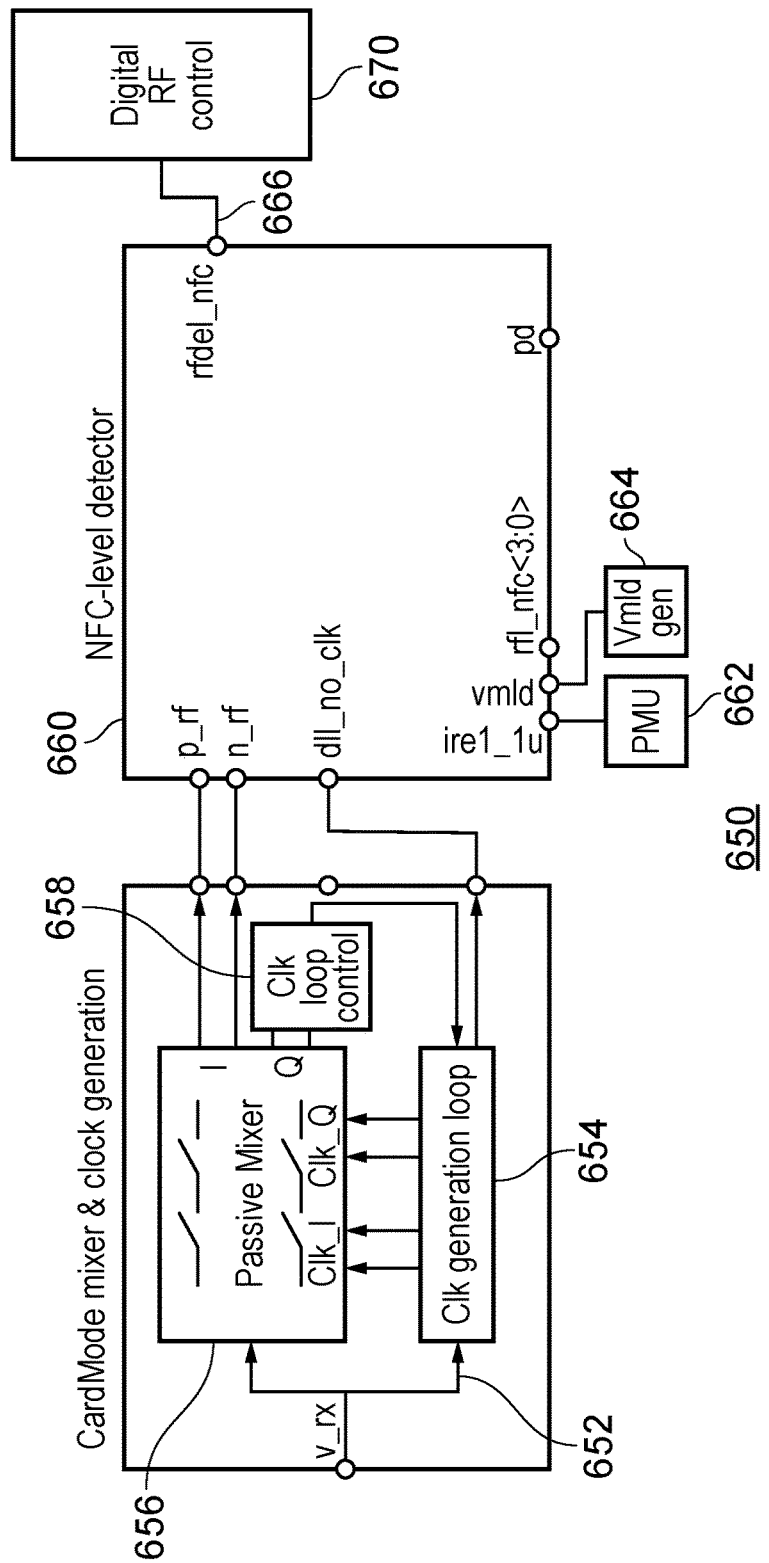
FIG. 11 shows an example RF device detector circuit.

FIG. 11 shows an example card detector 650. An RF input 652 may be connected to a passive mixer 656. The passive mixer 656 may be driven by a clock generator 654 and output an I-channel and a Q channel. The clock loop controller may be connected between the Q channel output of the passive mixer and the clock generation loop. The I-channel outputs 672, 674 of the passive mixer 656 may be connected to an NFC level detector. The clock generator 654 may have an output connected to the NFC level detector 660. Power management unit 662 may be connected to the NFC level detector which provides a current source. A mid voltage level generator 664 may be connected to the NFC level detector which provides a reference voltage. The output 666 of the NFC level detector may be connected to the digital RF controller 670.

The card detector 650 may detect the presence of a possible magnetic field in the 13.56 MHz RFID-frequency range. For that purpose the envelope of the VRX received voltage signal at RF input 652 at the I-channel outputs 672, 674 (p_rf, n_rf) of the mixer 656 is taken as a representative measurement of the input level and is an input to detector block 660. If the envelope signal exceeds a programmable threshold voltage provided by the reference generation 664, the output signal RFDET_NFC at node 666 shall be set to a logic high level indicating the presence of a further RF device.

By having a separate clock generator in the card detector 650, any influence from phase noise variations of the crystal may be reduced or eliminated. Consequently the card detector behaviour is constant regardless of the distance between the card and the RF transceiver.

Figure 12:
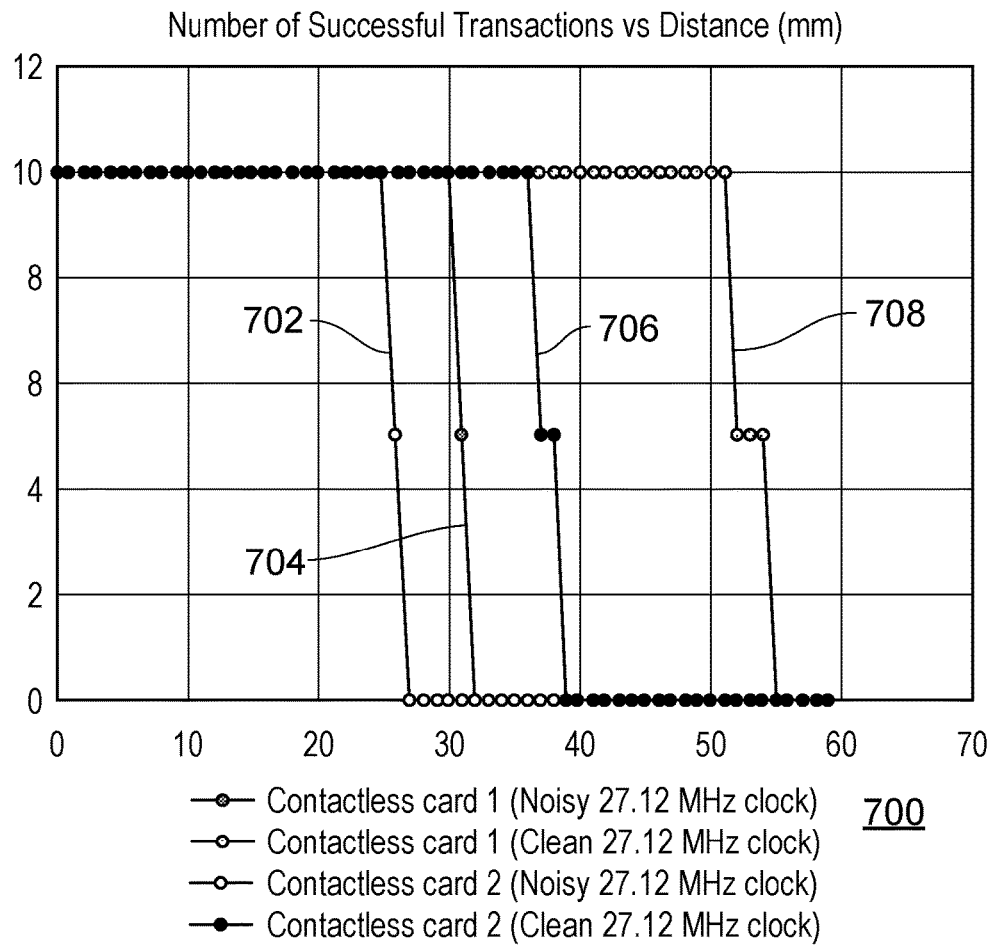
FIG. 12 shows the results of detecting contactless cards using each of the two clocks with the phase noise characteristics illustrated in FIG. 9.

FIG. 12 shows a graph 700 plotting the number of successful communication trials (out of 10) on the Y axis versus distance from 0 to 60 mm in the X-axis. Graph 700 shows the variation in detection distances for an RF transceiver communicating with two different contactless cards when using a first clock and a second clock having less phase noise than the first clock at frequencies as shown in FIG. 9. The first clock may be referred to as the noisy clock. The second clock may be referred to as the clean clock. Line 702 shows the detection results using the noisy clock at 27.12 MHz communicating with the first contactless card. Line 704 shows the detection results using the noisy clock at 27.12 MHz communicating with the second contactless card. Line 706 shows the detection results using the clean clock at 27.12 MHz communicating with the first contactless card. Line 708 shows the detection results using the clean clock at 27.12 MHz communicating with the second contactless card.

In the situation where the noisy 27.12 MHz clock is used, the first contactless card is reliably detected at distances closer than 31 mm and the second contactless card is detected reliably at distances closer than 26 mm. For a clean 27.12 MHz clock, the first contactless card is reliably detected at distances of 54 mm or less, and the second contactless card is reliably detected at distances of 38 mm or less. By improving the phase noise of the crystal oscillator, the contactless cards may be operated more reliably after initial detection.

Figure 13:
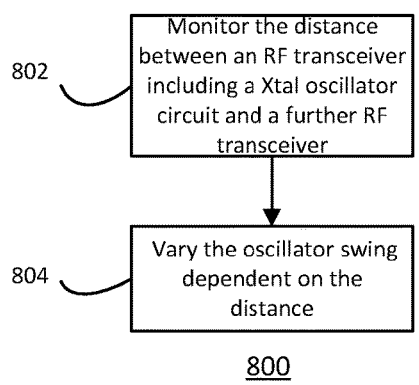
FIG. 13 shows a method of RF communication according to an embodiment.

FIG. 13 shows a method 800 of operating an RF transceiver for short range RF communication. In step 802 a distance is monitored between an RF transceiver including a crystal oscillator circuit and a further RF transceiver. In step 804, the oscillator swing or amplitude may be varied depending on the distance. The oscillator swing may vary dependent on the power supply applied to the crystal oscillator circuit or the gain of the amplifier in the crystal oscillator circuit. By varying the oscillator swing according to the distance, the reliability of the communication between the RF transceiver and the further RF transceiver may be improved without damaging the crystal used in the crystal oscillator circuit.

Figure 14:
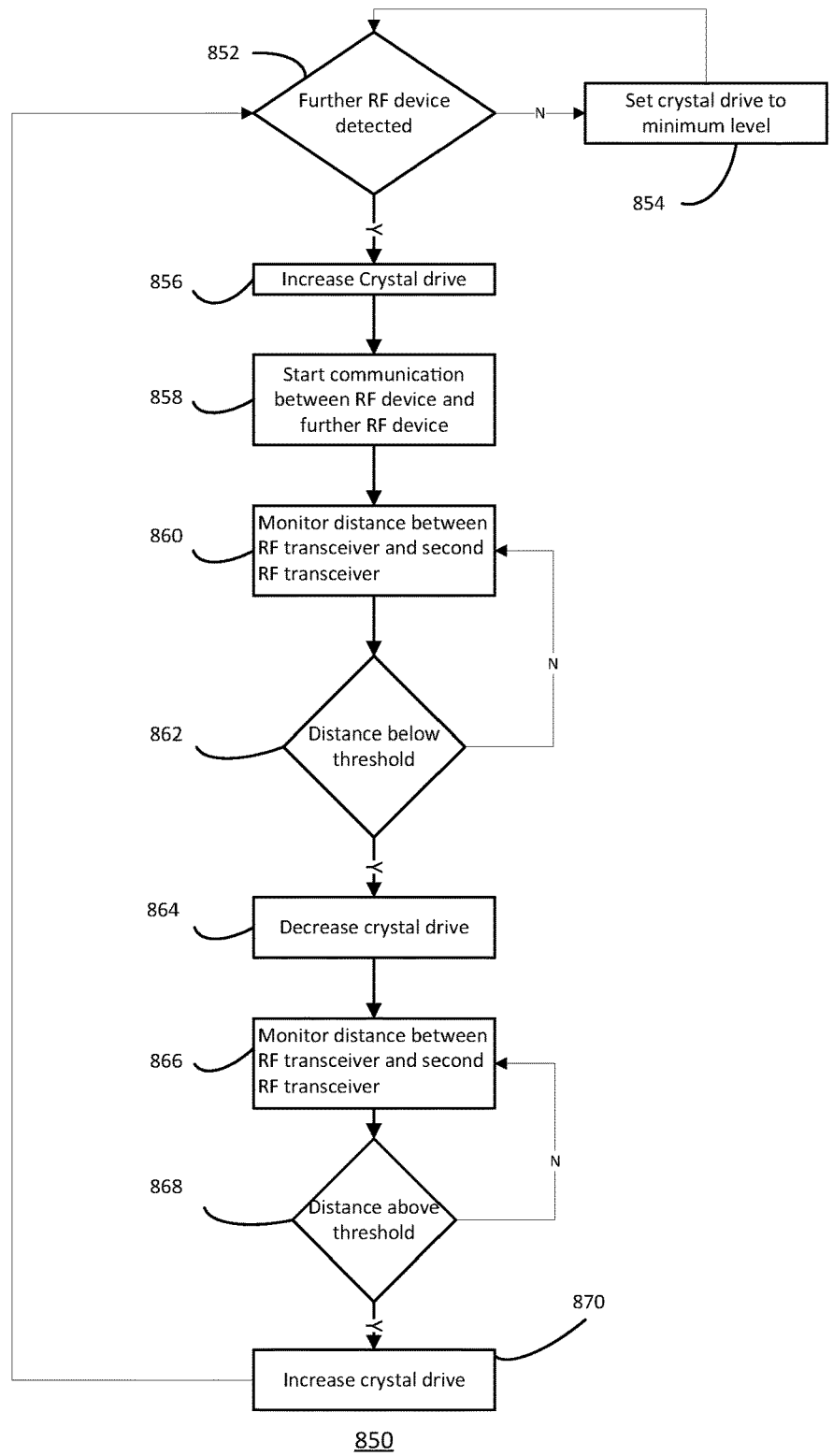
FIG. 14 illustrates a method of RF communication between a first RF device and the further RF device according to an embodiment.

FIG. 14 shows a method 850 operating an RF transceiver for short range RF communication. In step 852 a check is made to see whether a further RF device been detected. If a further RF device is not detected, then the method moves to step 854 and the crystal drive strength is set to a minimum value. The method then returns to the checking step 852.

If a further device has been detected, then the method moves to step 856, and the crystal drive strength is increased. In step 858 communications and started between the RF device and the further RF device. In step 860 the distance between the RF transceiver and the second RF transceiver is monitored. In step 862 a check is made to see whether the distance is below a predetermined threshold. If the distance is not below the threshold, then the method returns to step 860. If the distance is below the threshold, then the method moves to step 864 and the crystal drive is decreased. In step 866 the distance is monitored between the RF transceiver and the further RF transceiver. In step 868 a check is made to see if the distance is above a predetermined threshold. If the distance is above the predetermined threshold then the crystal drive strength is increased in step 870 and the method returns to the checking step of 852. If the distance is not above the threshold then the method returns to step 866.

A RF transceiver for RF communication with a further RF transceiver is described. The RF transceiver comprises a RF transmitter; a clock generator coupled to the RF transmitter, the clock generator comprising a crystal oscillator circuit including an amplifier, a distance monitor configured to monitor the distance between the RF transceiver and the further RF transceiver; a controller coupled to the distance monitor and the clock generator. The controller is configured to vary the crystal oscillator swing amplitude dependent on the distance between the RF transceiver and the further RF transceiver. Examples described include short-range RF transceivers for communication over distances over a few tens of meters or less. It will be appreciated that in other examples, RF transceivers may communicate over longer distances.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A RF transceiver for short-range RF communication with a further RF transceiver, the RF transceiver comprising:
a RF transmitter;
a clock generator coupled to the RF transmitter, the clock generator comprising a crystal oscillator circuit including an amplifier,
a distance monitor configured to monitor the distance between the RF transceiver and the further RF transceiver;
a controller coupled to the distance monitor and the clock generator; wherein the controller is configured to vary the crystal oscillator swing amplitude by varying a crystal power supply dependent on the distance between the RF transceiver and the further RF transceiver.

2. The RF transceiver of claim 1 further comprising a detector coupled to the controller, the detector being configured to detect the presence of the further RF transceiver; wherein
the controller is further configured to:
vary the crystal oscillator swing amplitude in response to the presence of the further RF transceiver being detected.

3. The RF transceiver of claim 1, wherein the crystal oscillator circuit comprises a crystal oscillator voltage driver for supplying power to the crystal oscillator circuit amplifier and wherein the controller is configured to increase the crystal oscillator swing amplitude by increasing the voltage supplied to the crystal oscillator circuit amplifier from a first voltage to a second higher voltage in response to the monitored distance being above a predetermined distance threshold.

4. The RF transceiver of claim 3 wherein the controller is configured to increase the crystal oscillator swing amplitude by reducing the voltage supplied from the second voltage to the first voltage after a predetermined time period.

5. The RF transceiver of claim 3, wherein the controller is configured to reduce the voltage from the second voltage to the first voltage in response to the monitored distance being below a further predetermined distance threshold.

6. The RF transceiver of claim 3, wherein the controller is configured to reduce the crystal supply voltage from the second voltage to the first voltage when no further RF transceiver is detected.

7. The RF transceiver of claim 3, wherein the crystal oscillator voltage driver comprises a slope generator coupled to a voltage regulator and wherein the slope generator is operable to change the input voltage to the voltage regulator between the first voltage value and the second voltage value in response to a control signal from the controller.

8. The RF transceiver of claim 1, wherein the distance monitor comprises a current sensor configured to determine a value of the current consumption during RF transmission by the RF transceiver and wherein the current consumption value is indicative of a relative distance between the RF transceiver and a further RF transceiver.

9. The RF transceiver of claim 8 wherein the crystal oscillator supply voltage is reduced in response to the variation in current consumption increasing above a reference current threshold.

10. The RF transceiver of claim 1, wherein the distance monitor comprises an amplitude detector configured to detect the amplitude of a received signal from a further RF transceiver.

11. The RF transceiver of claim 1, wherein the crystal oscillator circuit comprises a variable gain amplifier and wherein the controller is configured to vary crystal oscillator swing amplitude by varying the gain of the amplifier.

12. An NFC reader comprising the RF transceiver of claim 2, wherein the controller is configured to:
   detect the presence of a further NFC device;
   in response to the detection, increase the oscillator swing amplitude;
   in response to the monitored distance being below a predetermined threshold, decrease the oscillator swing amplitude;
   in response to the monitored distance being above a predetermined threshold, increase the oscillator swing amplitude; and
   in response to the presence of the further NFC device no longer being detected, reduce the oscillator swing amplitude.

13. A method of RF communication for an RF transceiver comprising a crystal oscillator circuit including an amplifier for providing a clock signal to the RF transceiver, the method comprising:
   monitoring the distance between the RF transceiver and a further RF transceiver; and
   varying the crystal oscillator amplitude swing by varying a crystal power supply dependent on the distance between the RF transceiver and the further RF transceiver.

14. The method of claim 13 further comprising detecting the presence of a further RF transceiver and varying the crystal oscillator amplitude swing by varying the supply voltage in response to the presence of a further RF transceiver being detected.

15. The method of claim 13, further comprising varying the amplitude swing by varying the crystal oscillator supply current in response to the presence of a further RF transceiver being detected.

* * * * *